United States Patent
Wesley, Sr.

[11] Patent Number: 5,906,329
[45] Date of Patent: May 25, 1999

[54] BATTERY OPERATED FISHING REEL LINE WINDER

[76] Inventor: John C. Wesley, Sr., 3520 3rd Ave., #110, San Diego, Calif. 92103

[21] Appl. No.: 09/061,197

[22] Filed: Apr. 16, 1998

[51] Int. Cl.[6] ............................. B65H 54/02; B65H 75/30
[52] U.S. Cl. .................................. 242/390.8; 242/396.6; 242/397.3; 242/902
[58] Field of Search ................................ 242/902, 390.8, 242/390.9, 396.6, 397.3, 404.2, 406, 423, 423.1, 423.2

[56] References Cited

U.S. PATENT DOCUMENTS

| | | | |
|---|---|---|---|
| 2,446,583 | 8/1948 | Gopner | 242/397.3 |
| 2,903,196 | 9/1959 | Fowler | 242/902 |
| 3,704,840 | 12/1972 | Haddock | 242/902 |
| 4,007,886 | 2/1977 | Kaminstein | 242/902 |
| 4,310,126 | 1/1982 | Norleen | 242/902 |
| 4,588,139 | 5/1986 | Lines | 242/902 |
| 4,948,064 | 8/1990 | Richard | 242/423.2 |
| 5,544,839 | 8/1996 | Burch | 242/902 |
| 5,709,350 | 1/1998 | Davis et al. | 242/902 |

*Primary Examiner*—John M. Jillions

[57] ABSTRACT

A fishing reel winding device is provided including a housing and a fishing reel clamp for fixing a fishing reel with respect to the housing. A fishing line spool assembly is rotatably mounted to the housing for feeding line to the fishing reel upon the rotation of the handle. A pair of friction arms are included for providing a force which abates rotation of the fishing line spool assembly.

16 Claims, 3 Drawing Sheets

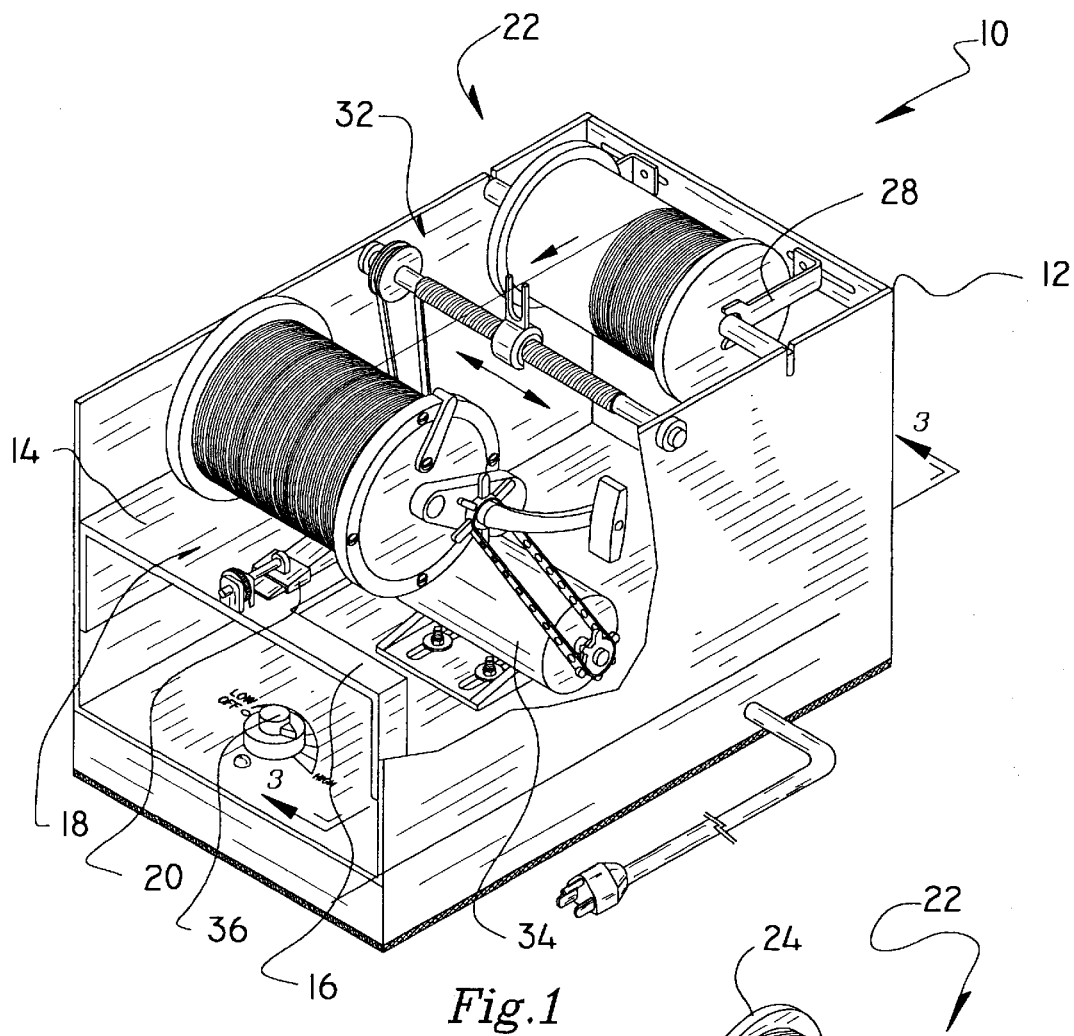
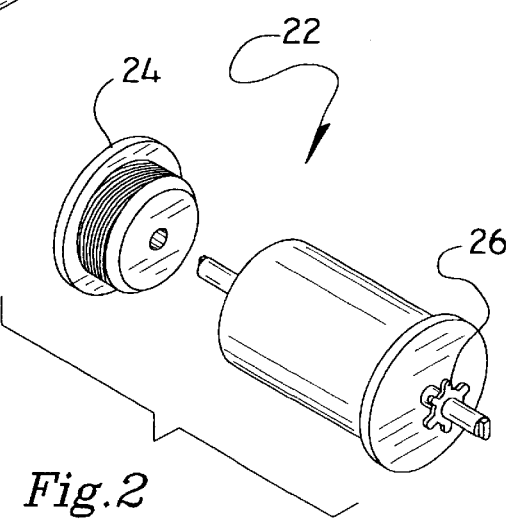
Fig.1
Fig.2

BATTERY OPERATED FISHING REEL LINE WINDER

BACKGROUND OF THE INVENTION

1. Field of the Invention

The present invention relates to fishing reels and more particularly pertains to a new battery operated fishing reel line winder for feeding line between a fishing reel and spool.

2. Description of the Prior Art

The use of fishing reels is known in the prior art. More specifically, fishing reels heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing reels include U.S. Pat. No. 5,029,409; U.S. Pat. No. 3,951,354; U.S. Pat. No. Des. 251,656; U.S. Pat. No. 5,209,423; U.S. Pat. No. 4,934,627; and U.S. Pat. No. 4,545,548.

In these respects, the battery operated fishing reel line winder according to the present invention substantially departs from the conventional concepts and designs of the prior art, and in so doing provides an apparatus primarily developed for the purpose of feeding line between a fishing reel and spool.

SUMMARY OF THE INVENTION

In view of the foregoing disadvantages inherent in the known types of fishing reels now present in the prior art, the present invention provides a new battery operated fishing reel line winder construction wherein the same can be utilized for feeding line between a fishing reel and spool.

The general purpose of the present invention, which will be described subsequently in greater detail, is to provide a new battery operated fishing reel line winder apparatus and method which has many of the advantages of the fishing reels mentioned heretofore and many novel features that result in a new battery operated fishing reel line winder which is not anticipated, rendered obvious, suggested, or even implied by any of the prior art fishing reels, either alone or in any combination thereof.

To attain this, the present invention generally comprises a housing having a rectangular configuration with a bottom face, a pair of side faces and an end face defining an open top with an upper peripheral edge and an open end face. The bottom face is weighted with a pad lining a bottom surface thereof. The housing further includes a horizontal shelf mounted between the side faces adjacent to the open end face. As shown in FIGS. 3A & 3B, the shelf has a length equal to less than ½ that of the housing. For reasons that will soon become apparent, the shelf has a cut out formed therein adjacent to one of the side faces of the housing. Next provided is a fishing reel clamp including a stationary sleeve mounted on an inboard end of a top face of the shelf. Associated therewith is an adjustable sleeve mounted on an outboard end of the top face of the shelf. The adjustable sleeve has a threaded post extending rearwardly therefrom and connected to a ball nut. As such, the adjustable sleeve is removably secured to a fishing reel thereby situating a handle of the fishing reel above the cut out of the shelf. As best shown in FIG. 1, a fishing line spool assembly is provided including a post having a pair of ends. Such ends are removably situated within a pair of openings formed in the upper peripheral edge of the housing adjacent to the end face thereof. The post is adapted for having a spool rotatably mounted thereon. As shown in FIG. 2, the spool includes a cylinder with a first annular flange fixed to a first side thereof and a second annular flange threadedly mounted to a second side thereof. Further, a gear is integrally coupled in concentric relationship with the first flange. The fishing line spool assembly further includes a pair of friction arms each having a first end with an apertured tab. Each of such tabs are adjustably coupled with an associated horizontal slot formed in the end face of the housing. A C-shaped second end of each arm is frictionally engaged with the flanges of the spool. Also included is a reciprocating guide unit including a horizontally oriented bar rotatably coupled between the side faces of the housing at a central extent of the upper peripheral edge thereof. A reciprocating U-shaped guide is mounted on the horizontally oriented bar for traversing back and forth along the horizontally oriented bar during the rotation thereof. A pulley is fixed in coaxial relationship with the horizontally oriented bar. Preferably, the pulley is situated adjacent to one of the side faces of the housing opposite that which resides adjacent to the gear of the spool. Mounted to a central extent of the bottom face of the housing is a motor with a horizontally oriented rotor. During use, the rotor remains in parallel with the horizontally oriented bar of the reciprocating guide unit. Such rotor further has a first end with a pulley mounted thereon for rotating the pulley of the reciprocating guide unit via a belt upon the actuation thereof. A second end of the rotor is equipped with a gear mounted thereon for rotating either the gear of the spool or the handle of the fishing reel via a belt. It should be noted that the belt is removable and constructed from an elastic material with a plurality apertures formed therein. Finally, a speed control dial is connected between a power source and the motor for controlling a speed of rotation of the rotor of the motor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new battery operated fishing reel line winder apparatus and method which has many of the advantages of the fishing reels mentioned heretofore and many novel features that result in a new battery operated fishing reel line winder which is not anticipated, rendered obvious, suggested, or even implied by any of the prior art fishing reels, either alone or in any combination thereof.

It is another object of the present invention to provide a new battery operated fishing reel line winder which may be easily and efficiently manufactured and marketed.

It is a further object of the present invention to provide a new battery operated fishing reel line winder which is of a durable and reliable construction.

An even further object of the present invention is to provide a new battery operated fishing reel line winder which is susceptible of a low cost of manufacture with regard to both materials and labor, and which accordingly is then susceptible of low prices of sale to the consuming public, thereby making such battery operated fishing reel line winder economically available to the buying public.

Still yet another object of the present invention is to provide a new battery operated fishing reel line winder which provides in the apparatuses and methods of the prior art some of the advantages thereof, while simultaneously overcoming some of the disadvantages normally associated therewith.

Still another object of the present invention is to provide a new battery operated fishing reel line winder for feeding line between a fishing reel and spool.

Even still another object of the present invention is to provide a new battery operated fishing reel line winder that includes a housing and a fishing reel clamp for fixing a fishing reel with respect to the housing. A fishing line spool assembly is rotatably mounted to the housing for feeding line to the fishing reel upon the rotation of the handle. A pair of friction arms are included for providing a force which abates rotation of the fishing line spool assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new battery operated fishing reel line winder according to the present invention.

FIG. 2 is an exploded perspective view of the spool of the present invention.

DESCRIPTION OF THE PREFERRED EMBODIMENT

Figure 3A:
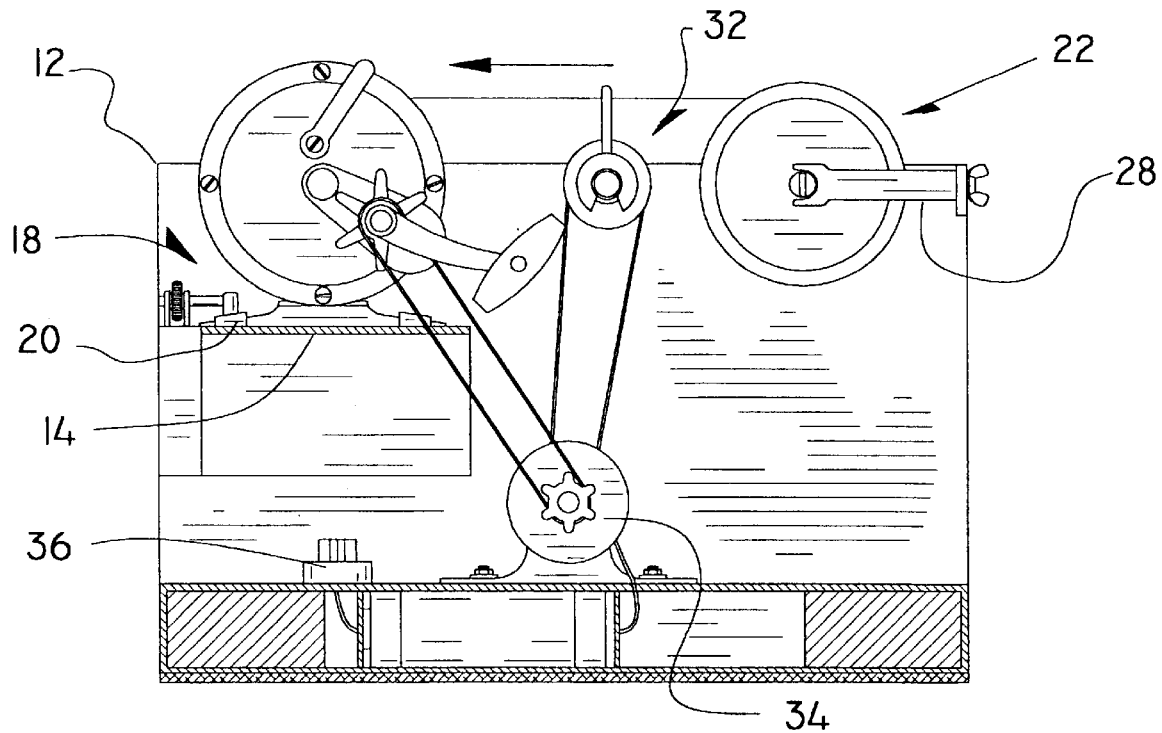
FIG. 3A is a side cross-sectional view of the present invention used to feed line to a fishing reel.

With reference now to the drawings, and in particular to FIGS. 1 through 5 thereof, a new battery operated fishing reel line winder embodying the principles and concepts of the present invention and generally designated by the reference numeral 10 will be described.

Figure 3B:
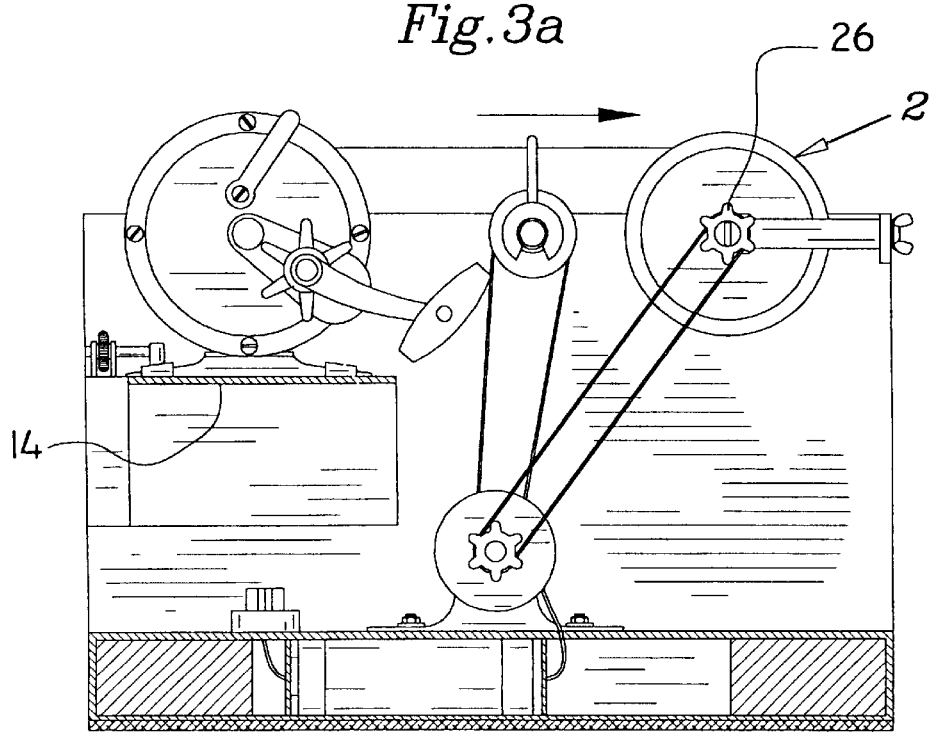
FIG. 3B is a side cross-sectional view of the present invention used to feed line to a spool.

The present invention, designated as numeral 10, includes a housing 12 having a rectangular configuration with a bottom face, a pair of side faces and an end face defining an open top with an upper peripheral edge and an open end face. The bottom face is weighted with a pad lining a bottom surface thereof. The housing further includes a horizontal shelf 14 mounted between the side faces adjacent to the open end face. As shown in FIGS. 3A & 3B, the shelf has a length equal to less than ½ that of the housing and a height ½ that of the housing. For reasons that will soon become apparent, the shelf has a cut out 16 formed therein adjacent to one of the side faces of the housing.

Next provided is a fishing reel clamp 18 including a stationary sleeve mounted on an inboard end of a top face of the shelf. Associated therewith is an adjustable sleeve 20 mounted on an outboard end of the top face of the shelf. The adjustable sleeve has a threaded post extending rearwardly therefrom and connected to a ball nut. This ball nut is rotatable about a fixed axis within a fixed plane between a pair of plates. Note FIGS. 1 & 3A–B. As such, the adjustable sleeve is removably secured to a fishing reel thereby situating a handle of the fishing reel above the cut out of the shelf.

As best shown in FIG. 1, a fishing line spool assembly 22 is provided including a post having a pair of ends. Such ends are removably situated within a pair of openings formed in the upper peripheral edge of the housing adjacent to the end face thereof. The post is adapted for having a spool rotatably mounted thereon. As shown in FIG. 2, the spool includes a cylinder with a first annular flange fixed to a first side thereof and a second annular flange 24 threadedly mounted to a second side thereof for facilitating the removal of line therefrom. This is preferably accomplished by way of a threaded cylinder extending inwardly of the second annular flange which is adapted to screwably engage a threaded inner surface of the spool. Further, a gear 26 is integrally coupled in concentric relationship with the first flange. It should be noted that each component of the spool has a bore formed therein for accepting the post.

The fishing line spool assembly further includes a pair of friction arms 28 each having a first end with an apertured tab. Each of such tabs are adjustably coupled with an associated horizontal slot formed in the end face of the housing. A C-shaped second end of each arm encompasses the post and is frictionally engaged with the corresponding flange of the spool.

Also included is a reciprocating guide unit 32 including a horizontally oriented bar rotatably coupled between the side faces of the housing at a central extent of the upper peripheral edge thereof. A reciprocating U-shaped guide is mounted on the horizontally oriented bar for traversing back and forth along the horizontally oriented bar during the rotation thereof. A pulley is fixed in coaxial relationship with the horizontally oriented bar. Preferably, the pulley is situated adjacent to one of the side faces of the housing opposite that which resides adjacent to the gear of the spool. It should be noted that the specific structure used to reciprocate the U-shaped guide is commonly known in the art of fishing reels and commercially available. In use, the reciprocating guide unit ensures proper feeding of the line between the spool and fishing line, as will become apparent.

Mounted to a central extent of the bottom face of the housing is a motor 34 with a horizontally oriented rotor. During use, the rotor remains in parallel with the horizontally oriented bar of the reciprocating guide unit. Such rotor further has a first end with a pulley mounted thereon for rotating the pulley of the reciprocating guide unit via a belt upon the actuation thereof. A second end of the rotor is equipped with a gear mounted thereon. It should be noted that each of the gears of the present invention include radially extending elongated protrusions. The gear of the motor is adapted for rotating either the gear of the spool or the handle of the fishing reel via a belt depending on whether line is being fed to or removed from the fishing reel. In use, the belt is removable and constructed from an elastic material with a plurality apertures formed therein.

Finally, a speed control dial 36 is connected between a power source and the motor for controlling a direction and speed of rotation of the rotor of the motor. The foregoing power source may take the form of either a battery or an alternating electrical receptacle. In the preferred embodiment, the motor is run off of a heavy duty battery that is incorporated within the housing. Note FIGS. 3A & 3B. The use of a battery allows the present invention to be used away from land-based power sources for extended periods of time. This is critical since fishing reel line must often be changed frequently during the course of a boat outing to reduce the possibility of a broken line.

Figure 4:
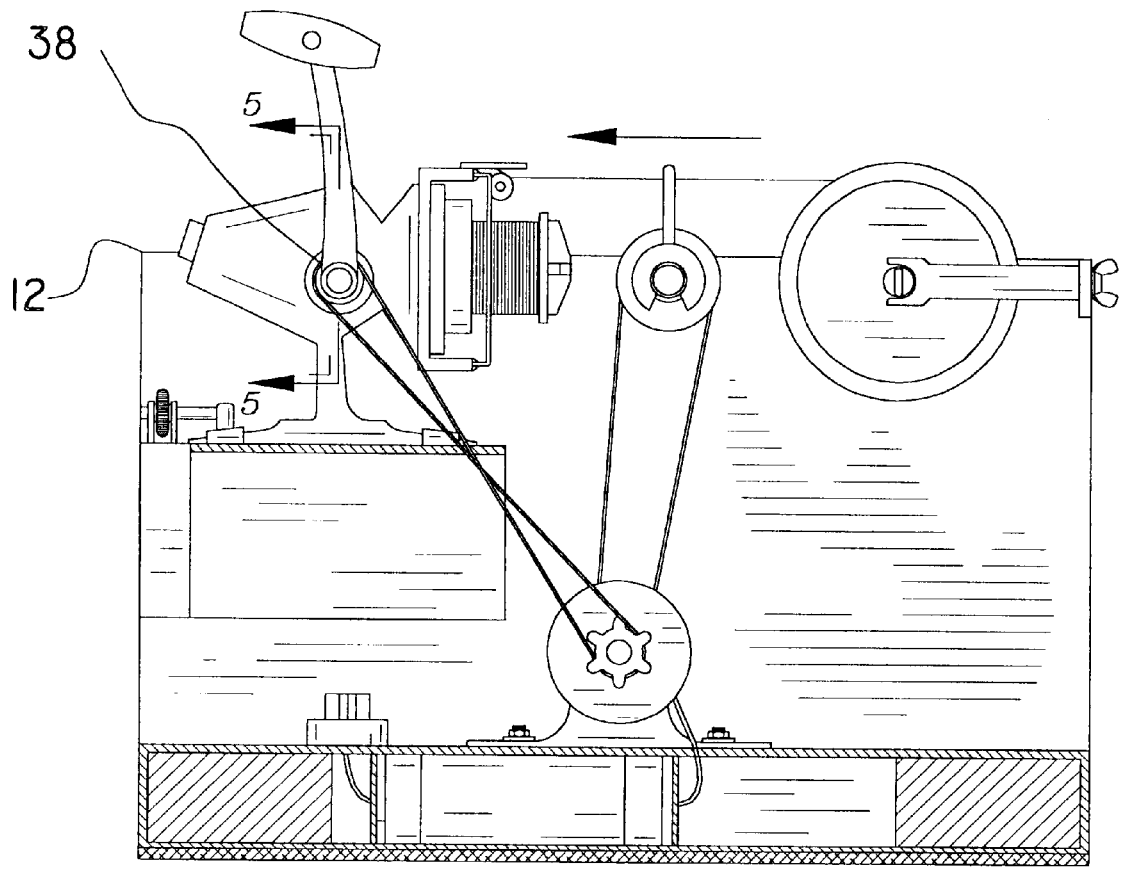
FIG. 4 is a side cross-sectional view of an alternate embodiment of the present invention.
Figure 5:
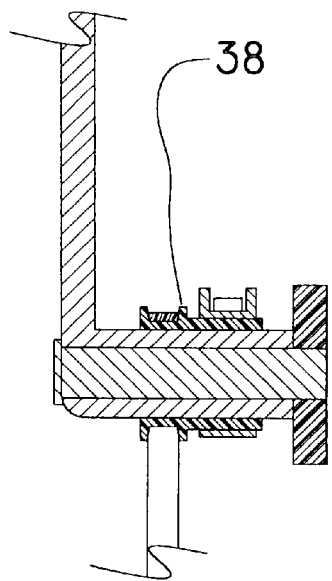
FIG. 5 is a cross-sectional view of the present invention taken along line 5—5 shown in FIG. 4.

In an alternate embodiment, as shown in FIGS. 4 & 5, a different form of fishing reel is accommodated. Since the handle of such reel fails to have a gear mounted thereon, a pulley 38 is removably clamped thereon for receiving a belt which in turn is connected to the motor for effecting rotation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing reel winding device comprising, in combination:
   a housing having a rectangular configuration with a bottom face, a pair of side faces and an end face defining an open top with an upper peripheral edge and an open end face, the bottom face being weighted with a pad lining a bottom surface thereof, the housing further including a horizontal shelf mounted between the side faces adjacent to the open end face and having a length equal to less than ½ that of the housing, wherein the shelf has a cut out formed therein adjacent to one of the side faces of the housing;
   a fishing reel clamp including a stationary sleeve mounted on an inboard end of a top face of the shelf and an adjustable sleeve mounted on an outboard end of the top face of the shelf, the adjustable sleeve having a threaded post extending rearwardly therefrom and connected to a ball nut such that the adjustable sleeve is removably secured to a fishing reel thereby situating a handle of the fishing reel above the cut out of the shelf;
   a fishing line spool assembly including a post having a pair of ends removably situated within a pair of openings formed in the upper peripheral edge of the housing adjacent to the end face thereof for having a spool rotatably mounted thereon, the spool including a cylinder with a first annular flange fixed to a first side thereof, a second annular flange threadedly mounted to a second side thereof, and a gear integrally coupled in concentric relationship with the first flange, the fishing line spool assembly further including a pair of friction arms each having a first end with an apertured tab adjustably coupled with an associated horizontal slot formed in the end face of the housing and a C-shaped second end frictionally engaged with the flanges of the spool;
   a reciprocating guide unit including a horizontally oriented bar rotatably coupled between the side faces of the housing at a central extent of the upper peripheral edge thereof, a reciprocating U-shaped guide adapted to traverse back and forth along the horizontally oriented bar during the rotation thereof, and a pulley fixed in coaxial relationship with the horizontally oriented bar adjacent to one of the side faces of the housing opposite that which resides adjacent to the gear of the spool;
   a motor mounted to the bottom face of the housing at a central extent thereof with a horizontally oriented rotor which remains in parallel with the horizontally oriented bar of the reciprocating guide unit, the rotor having a first end with a pulley mounted thereon for rotating the pulley of the reciprocating guide unit via a belt upon the actuation thereof and a second end with a gear mounted thereon for rotating at least one of the gear of the spool and the handle of the fishing reel via a removable elastic belt with a plurality apertures formed therein; and
   a speed control dial connected between a power source and the motor for controlling a speed of rotation of the rotor of the motor.

2. A fishing reel winding device comprising:
   a housing;
   a fishing reel clamping means for fixing a fishing reel with respect to the housing;
   a fishing line spool assembly rotatably mounted to the housing for feeding line to the fishing reel upon the rotation of a handle of the fishing reel; and
   friction means for providing a force which abates rotation of the fishing line spool assembly;
   wherein the handle has a pulley removable clamped thereon for receiving a belt which in turn is connected to a motor for effecting rotation.

3. A fishing reel winding device as set forth in claim 2 wherein the friction means includes at least one adjustable arm.

4. A fishing reel winding device as set forth in claim 2 wherein the motor has a speed control dial for governing a speed of rotation.

5. A fishing reel winding device as set forth in claim 2 and further including a reciprocating guide unit.

6. A fishing reel winding device as set forth in claim 5 wherein the reciprocating guide unit and the handle are rotated via a motor.

7. A fishing reel winding device as set forth in claim 2 wherein the handle is rotated by way of a motor which is powered by a portable battery.

8. A fishing reel winding device comprising:

a housing;

a fishing reel clamping means for fixing a fishing reel with respect to the housing;

a fishing line spool assembly rotatably mounted to the housing for feeding line to the fishing reel upon the rotation of a handle of the fishing reel; and friction means for providing a force which abates rotation of the fishing line spool assembly;

wherein the handle is rotated by way of a motor;

wherein the motor and handle are connected via a removable belt.

9. A fishing reel winding device as set forth in claim 8 wherein the friction means includes at least one adjustable arm.

10. A fishing reel winding device as set forth in claim 8 wherein the motor has a speed control dial for governing a speed of rotation.

11. A fishing reel winding device as set forth in claim 8 wherein the belt has a plurality of apertures formed therein for engaging a gear of the fishing reel and motor.

12. A fishing reel winding device as set forth in claim 8 wherein the belt is removably securable to the spool assembly for feeding line onto the spool from the fishing reel.

13. A fishing reel winding device as set forth in claim 12 wherein the spool has a removable flange for facilitating the removal of line therefrom.

14. A fishing reel winding device as set forth in claim 8 and further including a reciprocating guide unit.

15. A fishing reel winding device as set forth in claim 14 wherein the reciprocating guide unit and the handle are rotated via a motor.

16. A fishing reel winding device as set forth in claim 8 wherein the handle is rotated by way of a motor which is powered by a portable battery.

* * * * *